(12) United States Patent
Yang

(10) Patent No.: US 8,898,369 B1
(45) Date of Patent: Nov. 25, 2014

(54) CODE STORAGE USING VOLATILE MEMORY

(75) Inventor: Yun Yang, Los Altos, CA (US)

(73) Assignee: Vital Connect, Inc., Campbell, CA (US)

(*) Notice: Subject to any disclaimer, the term of this patent is extended or adjusted under 35 U.S.C. 154(b) by 242 days.

(21) Appl. No.: 13/353,184

(22) Filed: Jan. 18, 2012

(51) Int. Cl.
*G06F 12/00* (2006.01)

(52) U.S. Cl.
USPC ........... 711/102; 711/100; 711/101; 711/103; 711/104; 711/111

(58) Field of Classification Search
CPC ..... G06F 12/00; G06F 12/02; G06F 12/0246; G06F 12/08; G06F 12/0802; G06F 12/0238; G06F 8/65
USPC .................. 711/100, 101, 102, 103, 104, 111, 711/E12.001, E12.002
See application file for complete search history.

(56) References Cited

U.S. PATENT DOCUMENTS 6,925,522 B2 * 8/2005 Pang .............................. 711/103
2013/0151751 A1 * 6/2013 Widmer et al. ................ 711/103

FOREIGN PATENT DOCUMENTS

EP        19222 A   * 11/1980
KR   2009052582 A   *  5/2009

* cited by examiner

*Primary Examiner* — Midys Rojas
(74) *Attorney, Agent, or Firm* — Sawyer Law Group, P.C.

(57) ABSTRACT

A method and system for code storage using volatile memory are disclosed. In a first aspect, the method comprises providing a system on a chip (SOC) that includes at least one volatile memory. The method includes coupling a portable power source to the SOC, wherein the portable power source powers the at least one volatile memory with minimal leakage. The method includes storing updatable code on the at least one volatile memory. In a second aspect, the system comprises a system on a chip (SOC) and at least a Static Random-Access Memory (SRAM) coupled to the SOC with updatable code stored therein. The system includes a portable power source coupled to the SOC, wherein the portable power source powers the SRAM with minimal leakage.

19 Claims, 4 Drawing Sheets

US 8,898,369 B1

CODE STORAGE USING VOLATILE MEMORY

FIELD OF THE INVENTION

The present invention relates to code storage, and more particularly, to code storage using volatile memory.

BACKGROUND

Code can be stored on a variety of different types of memory. Conventional methods mandate that the code, including firmware code, be stored on a system using non-volatile memory such as Read-Only Memory (ROM), Electrically Erasable Programmable Read-Only Memory (EEPROM), or flash memory. ROM is a low cost code storage option but is inflexible and time consuming as silicon re-spinning is required every time changes to the ROM code are desired. As a result, updating firmware code that has been stored on ROM is not possible.

Additionally, code can be stored on a system that has incorporated flash memory either by an embedded flash process, a stacked flash process, or an external flash setup. However, although utilizing flash memory is a flexible code storage option, it adds significant costs to the system.

These issues limit the storage and updating of code. Therefore, there is a strong need for a cost-effective solution that overcomes the above issues by storing code on a type of memory that also allows for efficient updating. The present invention addresses such a need.

SUMMARY OF THE INVENTION

A method and system for code storage using volatile memory are disclosed. In a first aspect, the method comprises providing a system on a chip (SOC) that includes at least one volatile memory. The method includes coupling a portable power source to the SOC, wherein the portable power source powers the at least one volatile memory with minimal leakage. The method includes storing updatable code on the at least one volatile memory.

In a second aspect, the system comprises a system on a chip (SOC) and at least a Static Random-Access Memory (SRAM) coupled to the SOC with updatable code stored therein. The system includes a portable power source coupled to the SOC, wherein the portable power source powers the SRAM with minimal leakage.

BRIEF DESCRIPTION OF THE DRAWINGS

The accompanying figures illustrate several embodiments of the invention and, together with the description, serve to explain the principles of the invention. One of ordinary skill in the art will recognize that the particular embodiments illustrated in the figures are merely exemplary, and are not intended to limit the scope of the present invention.

DETAILED DESCRIPTION OF PREFERRED EMBODIMENTS

The present invention relates to code storage, and more particularly, to code storage using volatile memory. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

A method and system in accordance with the present invention allows for updatable code to be stored on volatile memory. By implementing into a device a portable power source coupled to a system on a chip (SOC) that includes volatile memory, such as Static Random-Access Memory (SRAM), and programming updatable code into the SRAM, an efficient and cost-effective code storage system is achieved that can support the updating of programmable code while the device is in use. One of ordinary skill in the art readily recognizes that a variety of devices may be utilized by the code storage system including wireless sensor devices and that would be within the spirit and scope of the present invention.

To describe the features of the present invention in more detail, refer now to the following description in conjunction with the accompanying Figures.

In one embodiment, a printed circuit board (PCB) is provided that includes a system on a chip (SOC). One of ordinary skill in the art readily recognizes that the PCB can be flexible or rigid and that would be within the spirit and scope of the present invention. The SOC includes at least a Static Random-Access Memory (SRAM) and a Read-Only Memory (ROM). A portable power source, including but not limited to a solar cell or a battery, is installed on the PCB and connected to the SOC prior to a manufacturing in-circuit test (ICT) process.

Initial updatable code, including but not limited to firmware, is programmed into the SRAM and initial stable code is manufactured into the ROM during a silicon fabrication process and prior to the PCB assembly. The PCB is manufactured into a wireless sensor device. An ultra low leakage silicon process is utilized to ensure minimum portable power source drain and leakage during the shell life of the wireless sensor device.

Figure 1:
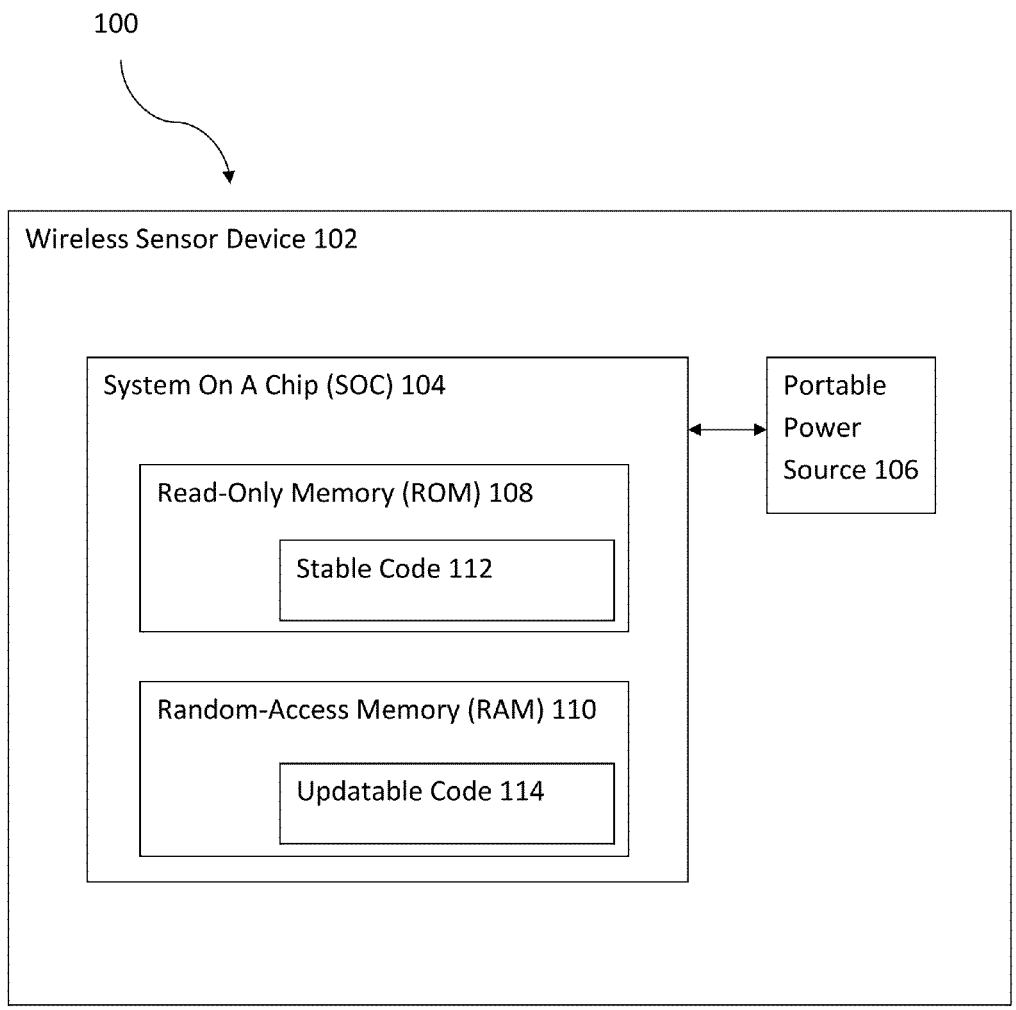
FIG. 1 illustrates a wireless sensor device in accordance with an embodiment.

FIG. 1 illustrates a system 100 in accordance with an embodiment. The system 100 includes a wireless sensor device 102, a system on a chip (SOC) 104 housed in the wireless sensor device 102, and a portable power source 106 coupled to the SOC 104. One of ordinary skill in the art readily recognizes that the portable power source 106 can be a variety of devices including but not limited to a battery, an energy harvesting unit, and a solar cell and that would be within the spirit and scope of the present invention.

The SOC 104 includes a Read-Only Memory (ROM) 108 and a Random-Access Memory (RAM) 110. One of ordinary skill in the art readily recognizes that the ROM can be a variety of non-volatile memory devices including but not limited to EEPROM and that would be within the spirit and scope of the present invention. One of ordinary skill in the art readily recognizes that the RAM can be a variety of volatile memory devices including but not limited to Static Random-Access Memory (SRAM) and that would be within the spirit and scope of the present invention.

The ROM 108 stores stable code 112. One of ordinary skill in the art readily recognizes that the stable code 112 can be a variety of different types of stable code including but not limited to boot loader, function, and application programming interface (API) code and that would be within the spirit and scope of the present invention. The RAM 110 stores updatable code 114 that may be updated before, during, or after production of the wireless sensor device 102. One of ordinary skill in the art readily recognizes that the updatable code 114 can be a variety of different types of updatable code including but not limited to firmware, operating system interaction, and product feature code and that would be within the spirit and scope of the present invention.

Figure 2:
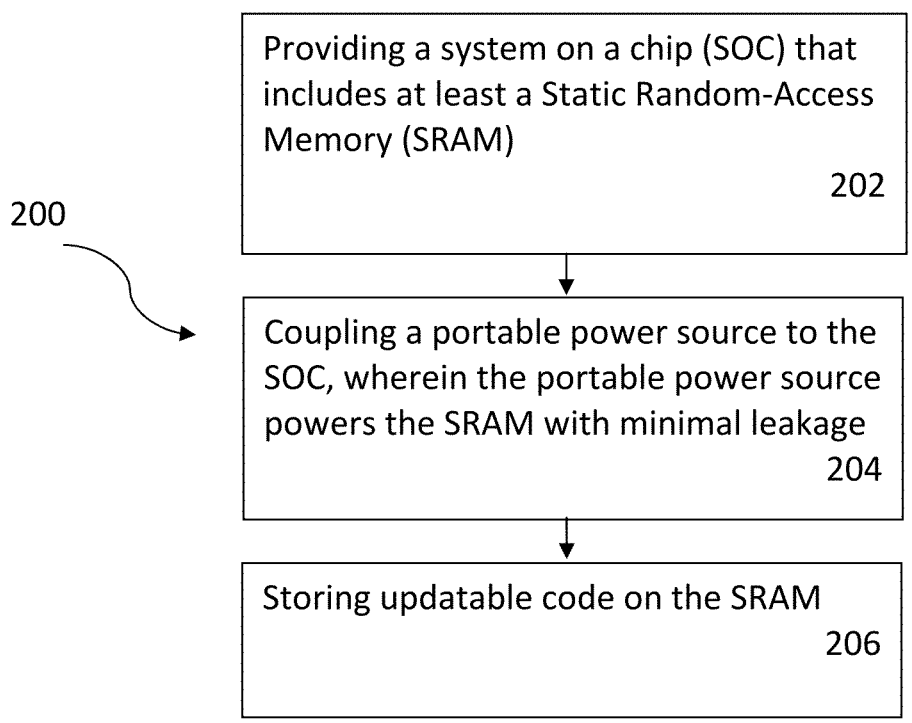
FIG. 2 illustrates a flow chart of a method for code storage using volatile memory in accordance with an embodiment.

FIG. 2 illustrates a flow chart 200 of a method for code storage using volatile memory in accordance with an embodiment. Referring to FIGS. 1 and 2 together, the SOC 104 that includes at least a Static Random-Access Memory (SRAM) is provided, via step 202. One of ordinary skill in the art readily recognizes that the SOC 104 may include a variety of additional components including but not limited to processors, memory, controlling software, and circuits and that would be within the spirit and scope of the present invention. The portable power source 106 powers the SRAM with minimal leakage and is coupled to the SOC 104, via step 204. The updatable code 114 is stored on the SRAM, via step 206.

In one embodiment, the SRAM stores the updatable code 114 for up to a predetermined time period. One of ordinary skill in the art readily recognizes that the predetermined time period can include but is not limited to a shelf life or a lifetime of the wireless sensor device 102 and that would be within the spirit and scope of the present invention. Storing the updatable code 114 on the SRAM for the shelf life or the lifetime of the wireless sensor device 102 requires that the portable power source 106 power the SOC 104 and particularly the SRAM for the entire shelf life or lifetime of the wireless sensor device 102. As a result, in one embodiment, the portable power source 106 is irreplaceable to ensure the updatable code 114 is not lost.

In one embodiment, step 206 includes providing in-circuit test (ICT) contact points on the wireless sensor device 102 that expose an interface that includes a plurality of electrical contacts to a tester for programming the updatable code 114 into the SRAM through the plurality of electrical contacts during a manufacturing ICT process. Prior to the manufacturing ICT process and the programming of the updatable code 114 into the SRAM, the portable power source 106 is installed and coupled to the SOC 104 of the wireless sensor device 102.

One of ordinary skill in the art readily recognizes that the interface can be represented by a variety of devices including but not limited to a serial peripheral interface (SPI) and that would be within the spirit and scope of the present invention. In addition, one of ordinary skill in the art readily recognizes that the plurality of electrical contacts can be represented by a variety of devices including but not limited to a plurality of pogo pins and that would be within the spirit and scope of the present invention.

One of ordinary skill in the art readily recognizes that the updatable code 114 can be updated in a variety of ways including but not limited to a remote wireless or a direct wired updating while the wireless sensor device 102 is in use or an updating while the wireless sensor device 102 is connected directly to a server or updating device and that would be within the spirit and scope of the present invention.

One of ordinary skill in the art readily recognizes that the portable power source 106 can power the SRAM with minimal leakage using a variety of mechanisms including but not limited to isolating power of the SRAM from power of the SOC 104, reducing a voltage level of the SRAM while maintaining a logic state of the SRAM, and utilizing an ultra low leakage silicon process for the manufacture of the wireless sensor device 102 to ensure minimal portable power source 106 drain and that would be within the spirit and scope of the present invention.

Figure 3:
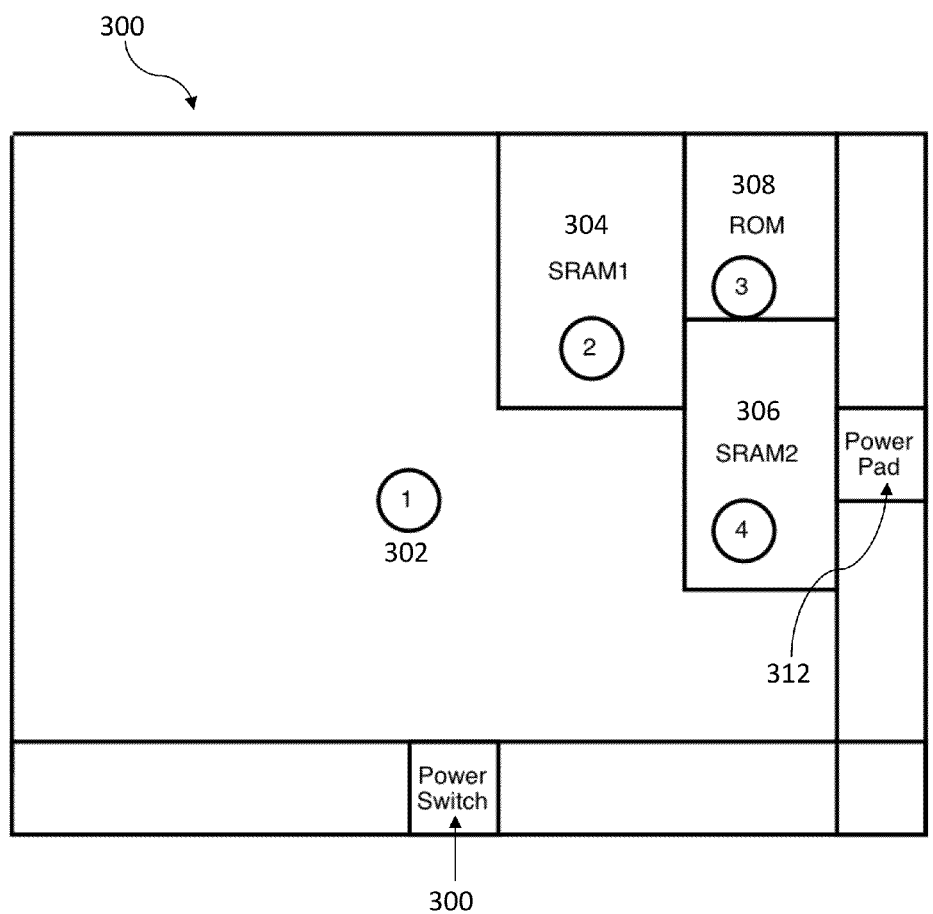
FIG. 3 illustrates a system on a chip (SOC) that isolates power of the SRAM in accordance with an embodiment.

FIG. 3 illustrates a system on a chip (SOC) 300 that isolates power of the SRAM in accordance with an embodiment. The SOC 300 includes a first region 302, a first SRAM 304, a second SRAM 306, a ROM 308, a power switch 310, and a power pad 312. The power switch 310 powers the first region 302, the first SRAM 304, and the ROM 308 and can be turned off to reduce the overall leakage of the SOC 300. The power pad 312 constantly powers the second SRAM 306 to ensure that code and content is not lost.

Figure 4:
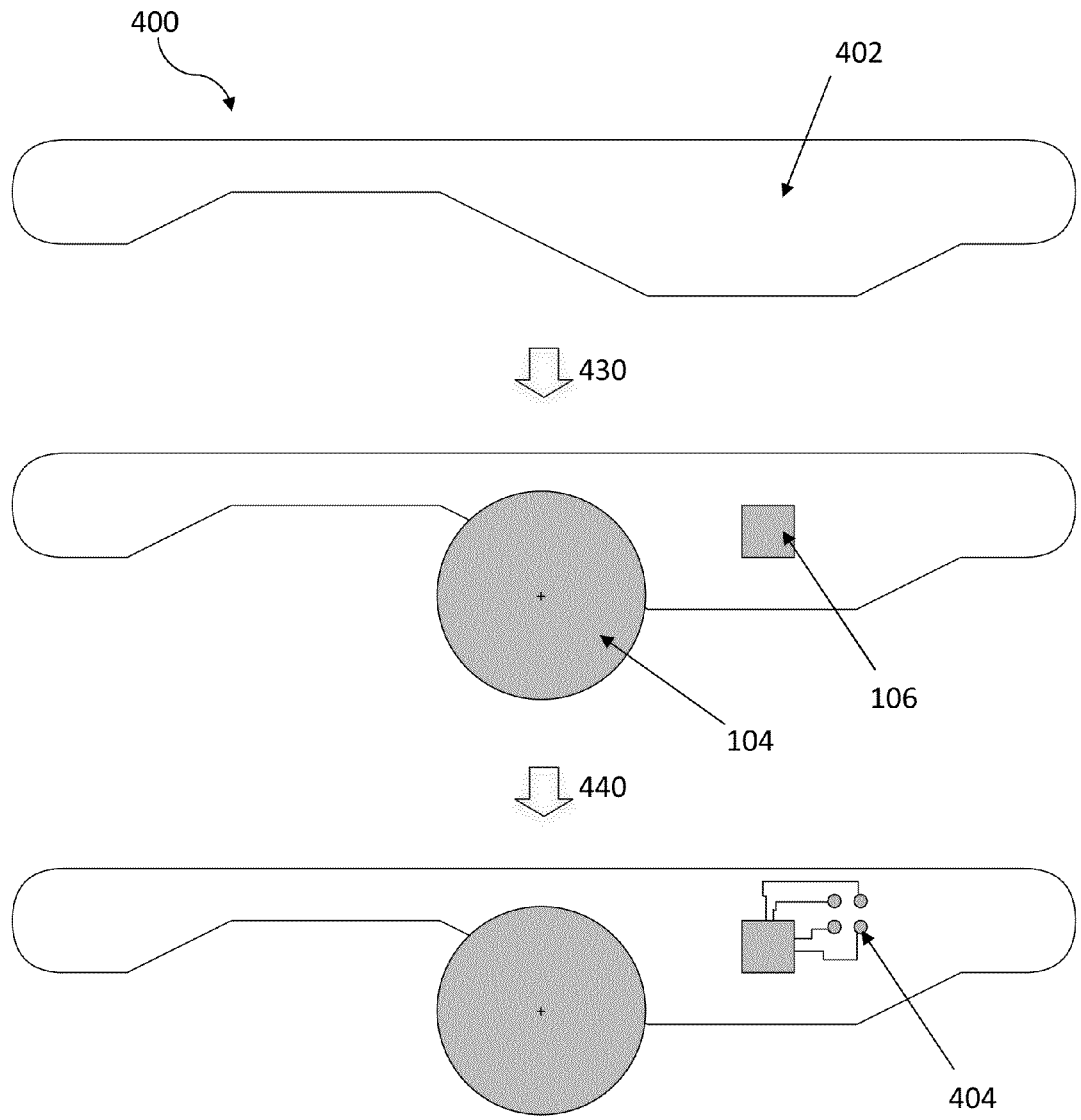
FIG. 4 illustrates a manufacturing process in accordance with an embodiment.

FIG. 4 illustrates a manufacturing process 400 in accordance with an embodiment. Referring to FIGS. 1, 2 and 4 together, a flexible printed circuit board 402 is provided. The SOC 104 and the portable power source 106 are installed on the printed circuit board 402, via step 430. The updatable code 114 is programmed into the SOC 104 through a plurality of pogo pins 404, via step 440. One of ordinary skill in the art readily recognizes that the manufactured printed circuit board can be included in a variety of devices including but not limited to the wireless sensor device 102 and that would be within the spirit and scope of the present invention.

As above described, the method and system allow for code storage using volatile memory in a wireless sensor device that is self powered or energy harvesting capable. Volatile memory, including but not limited to SRAM, is continuously powered by a portable power source for the shell life of the wireless sensor device. Updatable code is then programmed and stored in the volatile memory during a manufacturing process. In addition, stable code that does not need to be updated is stored in ROM. The combination of both ROM and SRAM enables the wireless sensor device to achieve both a low cost and a flexible code storage system that can be utilized to update the code while the wireless sensor device is in use.

A method and system for code storage using volatile memory has been disclosed. Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code or program instructions for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for code storage using volatile memory, the method comprising:
    providing a system on a chip (SOC), wherein the SOC includes at least one volatile memory;
    coupling a portable power source to the SOC, wherein the portable power source powers the at least one volatile memory with minimal leakage; and
    storing updatable code on the at least one volatile memory, wherein the at least one volatile memory is the only type of memory used to update the updatable code.

2. The method of claim 1, wherein the SOC includes at least one non-volatile memory, further comprising:
    storing stable code on the at least one non-volatile memory.

3. The method of claim 1, wherein storing updatable code on the at least one volatile memory further comprises:
    providing in-circuit test (ICT) contacts points on a printed circuit board (PCB) that expose an interface, wherein the interface includes a plurality of electrical contacts; and
    programming the updatable code into the at least one volatile memory through the plurality of electrical contacts.

4. The method of claim 1, wherein the coupling further comprises:
    isolating power of the at least one volatile memory from main power of the SOC.

5. The method of claim 1, wherein the coupling further comprises:
    reducing a voltage level of the at least one volatile memory.

6. The method of claim 1, further comprising:
    housing the SOC within a wireless sensor device.

7. The method of claim 6, further comprising:
    updating the updatable code remotely while the wireless sensor device is in use.

8. The method of claim 6, wherein the portable power source powers the at least one volatile memory for up to a predetermined time period.

9. The method of claim 6, wherein the portable power source powers the at least one volatile memory for a lifetime of the wireless sensor device.

10. The method of claim 2, wherein the at least one volatile memory is at least one Static Random Access Memory (SRAM) and the at least one non-volatile memory is at least one Read-Only Memory (ROM).

11. A wireless sensor device, the wireless sensor device comprising:
    a system on a chip (SOC);
    at least one Static Random-Access Memory (SRAM) coupled to the SOC with updatable code stored therein, wherein the SRAM is the only type of memory used to update the updatable code; and
    a portable power source coupled to the SOC, wherein the portable power source powers the SRAM with minimal leakage.

12. The wireless sensor device of claim 11, further comprising:
    in-circuit test (ICT) contact points coupled to the SOC, wherein the ICT contact points expose an interface; and
    a plurality of electrical contacts coupled to the interface;
    wherein code is updated by programming through the plurality of electrical contacts during a manufacturing ICT process.

13. The wireless sensor device of claim 12, wherein the interface is a serial peripheral interface (SPI) and the plurality of electrical contacts are a plurality of pogo pins.

14. The wireless sensor device of claim 11 wherein power of the SRAM is isolated from main power of the SOC.

15. The wireless sensor device of claim 11, wherein the portable power source powers the SRAM at a reduced voltage level.

16. The wireless sensor device of claim 11, wherein the updatable code is updated remotely while the wireless sensor device is in use.

17. The wireless sensor device of claim 11, wherein the portable power source powers the SRAM for up to a predetermined time period.

18. The wireless sensor device of claim 11, wherein the predetermined time period is a lifetime of the wireless sensor device.

19. The wireless sensor device of claim 11, wherein the portable power source is irreplaceable.

* * * * *